United States Patent [19]
Ricciardi et al.

[11] 4,449,597
[45] May 22, 1984

[54] FLEXURE WEIGHING SYSTEM

[75] Inventors: Ronald J. Ricciardi, Woodcliff Lake; Otto J. Rudolph, Oakland, both of N.J.

[73] Assignee: Acrison, Incorporated, Moonachie, N.J.

[21] Appl. No.: 371,457

[22] Filed: Apr. 23, 1982

[51] Int. Cl.³ ............... G01G 21/08; G01G 23/14; G01G 23/06
[52] U.S. Cl. .................... 177/256; 177/170; 177/188; 177/DIG. 9
[58] Field of Search .......... 177/170, 188, 256, DIG. 9

[56] References Cited

U.S. PATENT DOCUMENTS

| | | | |
|---|---|---|---|
| 2,483,700 | 10/1949 | Hansen | 177/170 X |
| 3,269,472 | 8/1966 | Bell | 177/188 X |
| 3,666,032 | 5/1972 | Maffia et al. | 177/256 |
| 3,894,595 | 7/1975 | Czyryk | 177/256 |
| 4,042,051 | 8/1977 | Ricciardi | 177/DIG. 9 |
| 4,189,018 | 2/1980 | Brouwer | 177/256 |
| 4,261,430 | 4/1981 | Knothe et al. | 177/256 X |

Primary Examiner—George H. Miller, Jr.
Attorney, Agent, or Firm—Davis, Hoxie, Faithfull & Hapgood

[57] ABSTRACT

A flexure weighing system comprising a split-beam assembly consisting of two beams centrally connected by a flexure linkage system. The split-beam assembly is also connected to a frame and to mounting studs which connect the outer, load-bearing ends of the beams to a weighing platform. One of the beams is connected to a weight sensor which produces an electrical signal indicative of the movement of the beam to which it is connected and therefore of the weight on the weighing platform which causes that movement. Preferably, flexures are used at all the key pivot points in the system.

21 Claims, 9 Drawing Figures

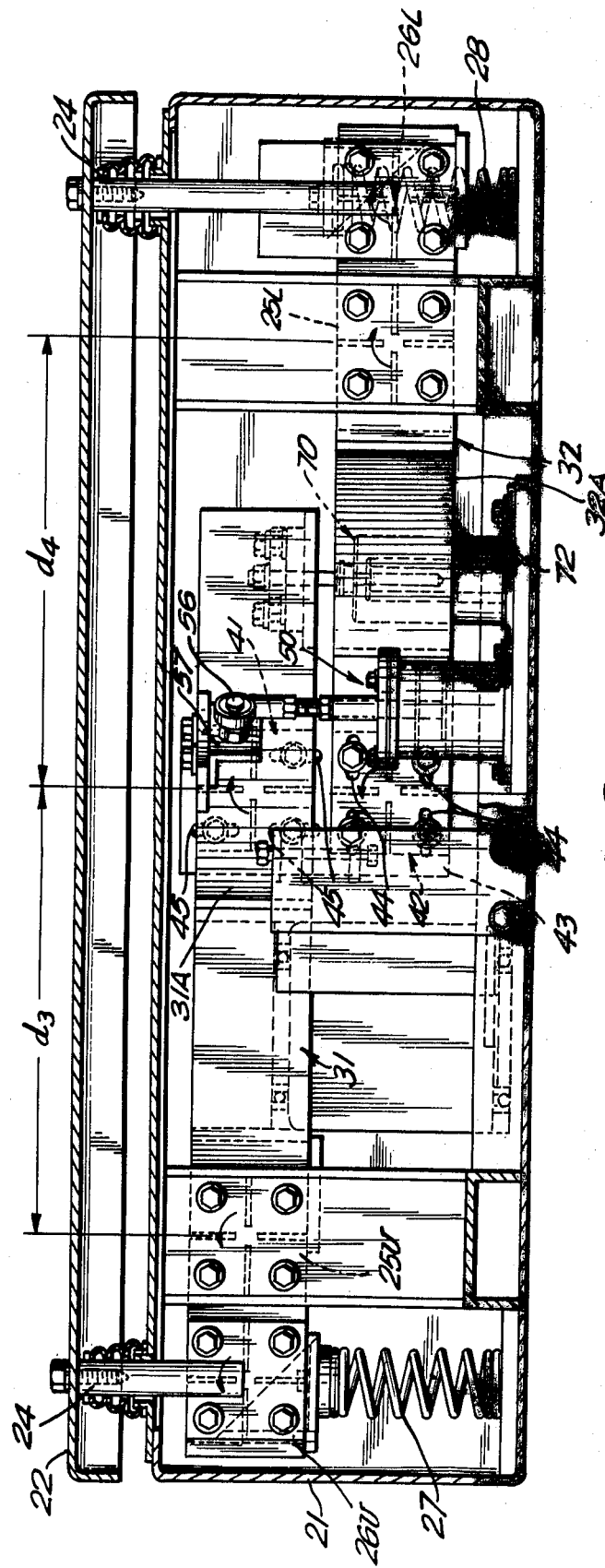

FLEXURE WEIGHING SYSTEM

FIELD OF THE INVENTION

This invention generally relates to a split-beam weighing system having virtually no friction and very high accuracy and particularly relates to such a system utilizing a plurality of flexures at pivot points within the system.

A variety of weighing systems have been developed which utilize such means as bearings, linkage pins, knife edges and the like to reduce friction at key pivot points in those systems. These systems have not been entirely satisfactory due to their lack of sensitivity or their inability to function maintenance-free over long periods of continuous usage. A flexibly mounted container system including flexural pivot means to overcome these deficiencies in the prior art is described in my U.S. Pat. No. 4,042,051. The system disclosed in that patent is substantially frictionless. Moreover, it has high sensitivity, linearity, accuracy and repeatability over a wide range of loads including very heavy loads.

SUMMARY OF THE INVENTION

The present invention provides a compact weighing system utilizing flexural pivot means or flexures of the type disclosed in U.S. Pat. No. 4,042,051 and adapted to be used in conjunction with a continuous feed mechanism or some other type of metering mechanism. This system achieves high sensitivity, linearity of operation, accuracy of weight measurement, repeatability and negligible hysteresis. The system is highly resistant to corrosion as well as to damage from operator misuse. The invention is particularly useful as an integral part of a continuous or batch weigh feeder system which operates to accurately measure and feed particulate solid ingredients. In many applications, it is essential to operate such systems on a continuous or nearly continuous basis and consequently a weighing system is needed which requires a minimum amount of adjustment and recalibration. The system of the invention provides excellent resolution and is virtually maintenance-free as a result of its novel design.

In one embodiment of the invention, the flexure weighing system includes a split-beam balance assembly having two halves. Each beam half has a load-bearing end and an interconnecting end and consists of a rectangular portion and an outwardly extending member rigidly connected thereto. The two interconnecting ends are connected together by a flexure linkage assembly which connects the outwardly extending members at the center of the apparatus. Each flexure comprises two spaced flanges or flange-like elements interconnected by a plurality of ribbon-like resilient cross-members, so that if the first flange is fixed while torque is applied to the second, the second will pivot or rotate with respect to the first. One outwardly extending member of a beam half is also connected to a weight sensor which translates the vertical movement of the portion of the beam half connected to the weight sensor into an electrical signal indicative of the weight placed upon the flexure weighing system. One of the outwardly extending members may also be connected to a dashpot which damps the physical motion of the balance assembly due to outside influences such as plant vibration and the like. Additional flexures located in the two corners of the rectangular portion of each beam furthest from the linkage assembly connect the load-bearing end of each beam to two mounting studs which support a weighing platform. The rectangular portion of each beam is pivotally connected to the frame of the weighing system by two more flexures.

The weighing operation occurs as follows. When an item to be weighed is placed upon the weighing platform, downward force is transmitted through the mounting studs to the load-bearing end of each half of the split-beam balance assembly. The flexures connecting the mounting studs to each half of the split-beam balance assembly "pivot" slightly as the load-bearing end of each half moves downward with the result that the downward force on each load-bearing end is always applied vertically. This downward force on the load-bearing end of each beam half also causes the flexures connecting each half to the frame and the two flexures joining the halves at the center of the device to "pivot."

While the load-bearing end of each half moves downwards, the interconnecting end of each half including each outwardly extending member rises. This rise is monitored by the weight sensor and translated into an electrical signal indicative of the weight of the item placed upon the weighing platform. The precise meaning of the term "pivot" as used in relation to a flexure will be explained more fully below.

The above described system achieves substantially frictionless weighing due to its use of flexures at all of the pivot points. This flexure arrangement, further details of the invention and its incorporation into a weigh feeder system will be discussed in conjunction with the drawings in the detailed description which follows.

BRIEF DESCRIPTION OF THE DRAWINGS

FIG. 5 is a side elevation taken along section line B—B of FIG. 2 of the flexure weighing system of FIGS. 1 and 2;

DETAILED DESCRIPTION

Figure 1:
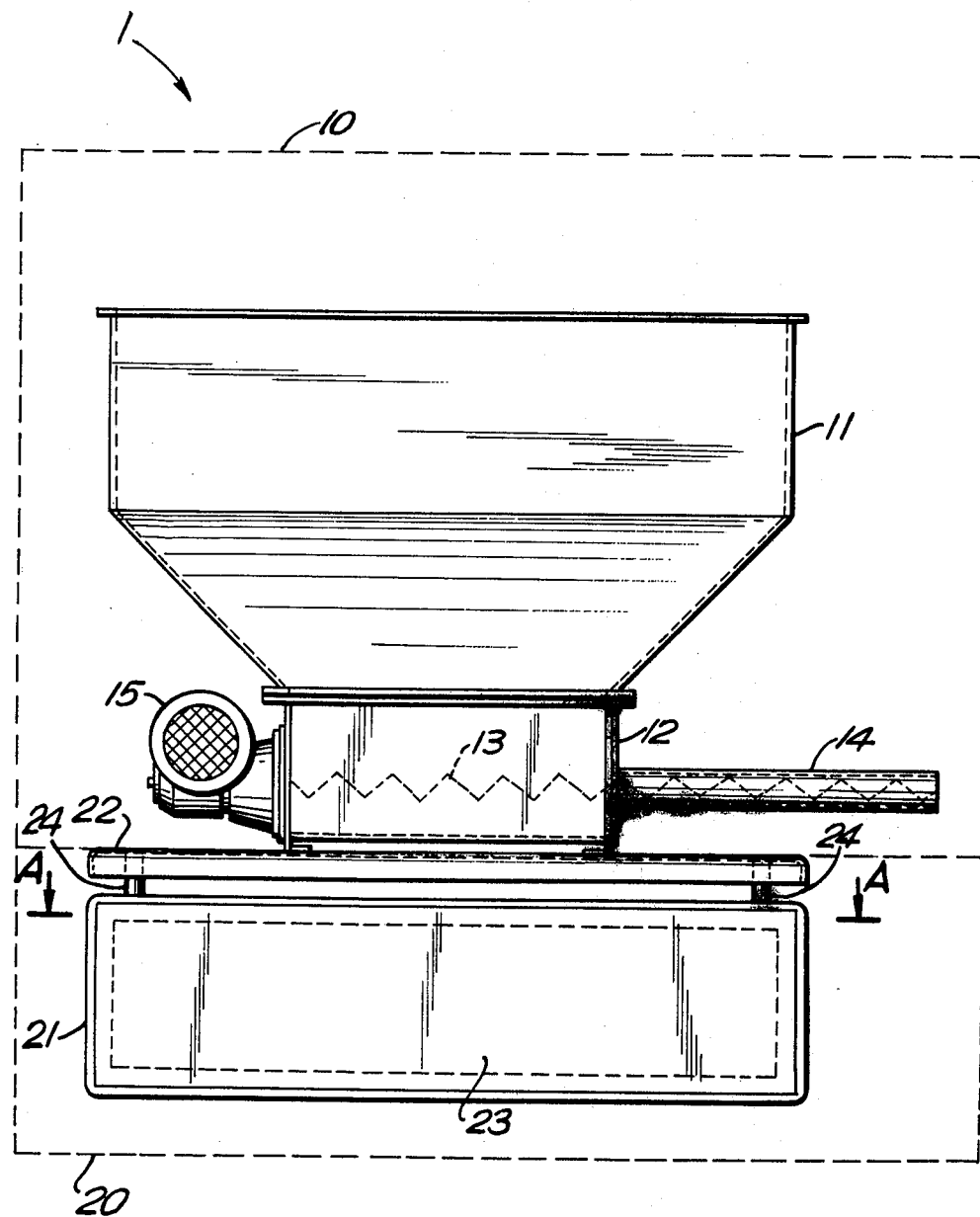
FIG. 1 is a side elevation of an auger feeding system incorporating a flexure weighing system according to the present invention.

FIG. 1 shows a weigh feeding system 1 including an auger feed mechanism 10 and the external details of a flexure weighing system 20. Feed mechanism 10 includes a hopper 11, a feed chamber 12 connected to the hopper 11, and discharge cylinder 14 connected to the feed chamber 12 and containing within it a feed auger 13 which is driven by motor 15. Material to be metered in a controlled fashion by feed mechanism 10 is placed in hopper 11. Under the influence of gravity or gravity assisted by mechanical agitation, the material flows from the hopper 11 into the feed chamber 12. When motor 15 is operating, auger 13 rotates so that material is pushed from feed chamber 12 through and then out the end of the discharge cylinder 14.

The flexure weighing system 20 includes a main frame 21, a weighing platform 22, removable side panels 23 of which the view shown in FIG. 1 only shows one and four mounting studs 24 of which the view shown in FIG. 1 only shows two. The four mounting studs 24 transmit the weight of platform 22 and feed mechanism 10 including its contents to the remainder of the flexure weighing system 20 which is located behind side panel 23. The internal details of the flexure weighing system 20 are shown in FIGS. 2-9 and will be discussed below.

In actual operation, a weigh feeding system 1 provides controlled metering as follows. The hopper 11 and feed chamber 12 are filled with a material to be metered. Motor 15 is activated manually or by an automatic controller system and the feed mechanism 10 begins to feed. As the material is metered out the end of discharge cylinder 14, the total weight of the contents of feed mechanism 10 gradually decreases. Flexure weighing system 20 monitors the total weight placed upon weighing platform 22 and produces an electrical signal indicative of that weight.

It is often desirable continuously to provide a constant rate of feed of material out the discharge cylinder 14. To achieve that end, the electrical signal indicative of the weight upon weighing platform 22, or a signal derived therefrom, may be used to modulate the speed of motor 15 and thus to control the material feed rate. For continuous feeding at a constant rate, the system must permit refilling hopper 11 and feed chamber 12 before they become empty. When hopper 11 is being filled, the total weight on weighing platform 22 of flexure weighing system 20 is increasing, yet the system must not permit this increasing weight to upset the feed rate. Techniques for accomplishing these objectives are disclosed in U.S. Pat. Nos. 3,889,848 and 3,967,758.

Figure 2:
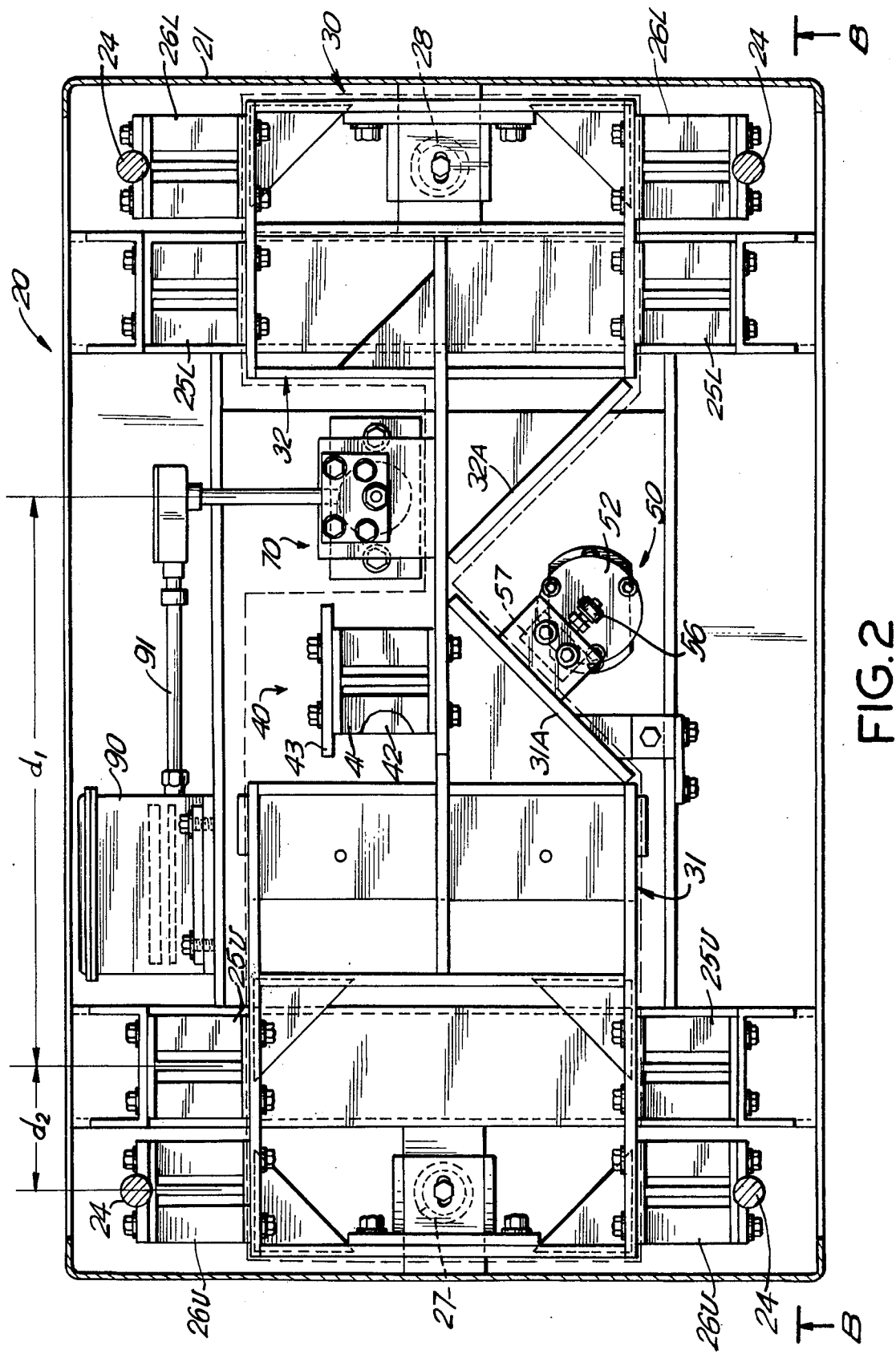
FIG. 2 is a plan view taken along section line A—A of FIG. 1.

FIG. 2 shows a plan view of flexure weighing system 20 taken below the weighing platform 22 and the upper portion of the main frame 21, along the section line A—A of FIG. 1. In the preferred embodiment shown, flexure weighing system 20 includes a split-beam balance assembly 30 having an upper beam 31 and a lower beam 32. Beams 31 and 32 are centrally joined by a flexure linkage assembly 40 which connects the interconnecting ends of beams 31 and 32 and includes upper and lower flexures 41 and 42. Upper beam 31 is connected to the main frame 21 by two flexures 25U with one flexure 25U connecting beam 31 to each side of frame 21. Similarly, lower beam 32 is connected to the main frame 21 by two flexures 25L. These flexure connections allow beams 31 and 32 to pivot slightly with respect to the main frame when weight is placed upon weighing platform 22. Downward force is transmitted from the weighing platform 22 through the mounting studs 24 to the outer portions or in other words the load-bearing ends of beams 31 and 32. The two left-hand studs 24 are connected to beam 31 by two flexures 26U. Similarly, the two right-hand studs are connected to beam 32 by two flexures 26L. These flexure connections insure that force is transmitted to beams 31 and 32 in a vertical direction even though the load-bearing ends of the beams 31 and 32 move downwards slightly when weight is placed upon weighing platform 22. FIG. 2 also shows distances $d_1$ and $d_2$ where $d_1$ is the distance between the center of weight sensor 70 and the axis of rotation of flexures 25U and where $d_2$ is the distance between the axis of rotation of flexures 26U and the axis of rotation of flexures 25U.

Additional details regarding flexure linkage assembly 40 are found below in the discussions of FIGS. 3, 4 and 5.

Figure 3:
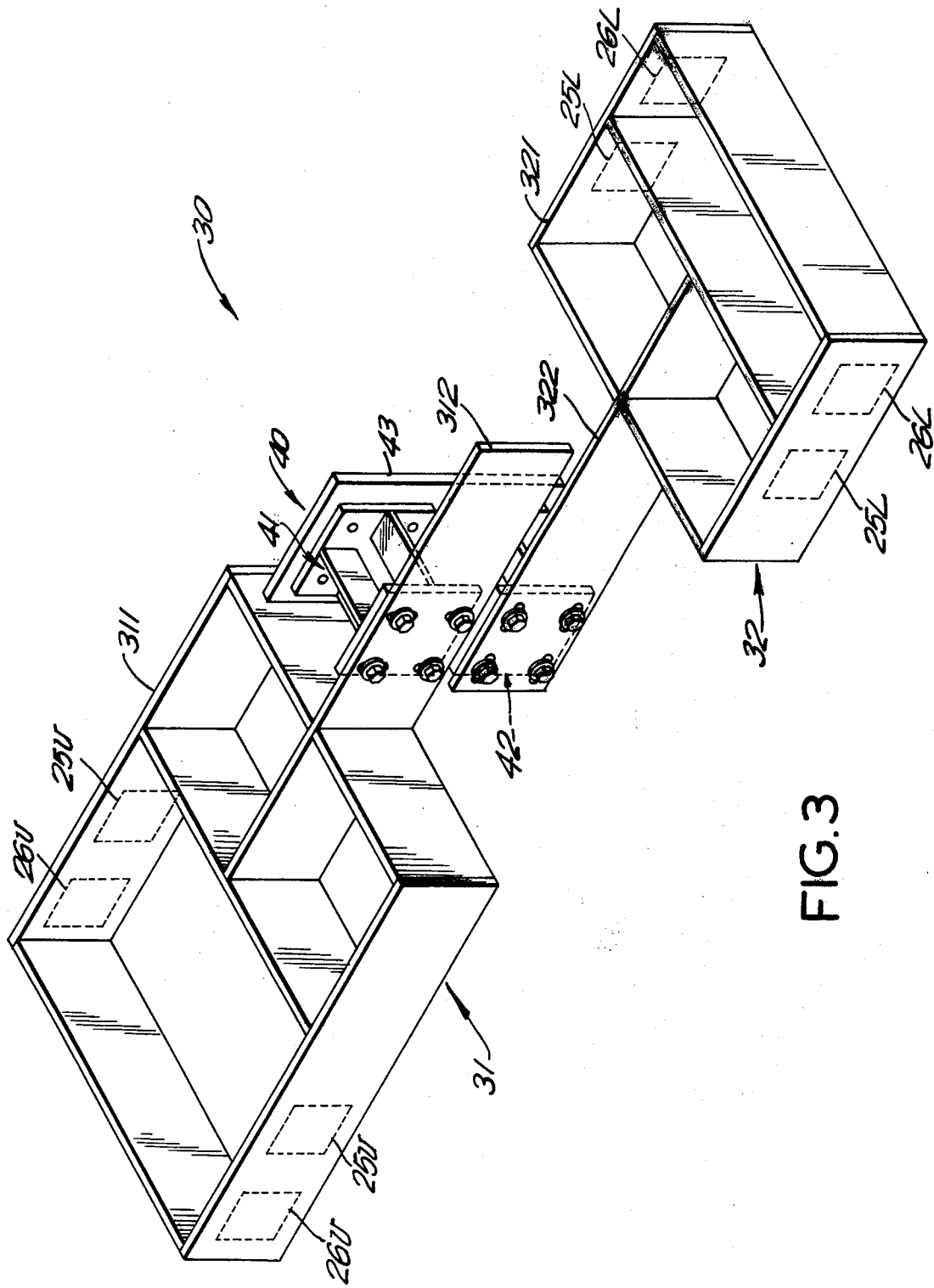
FIG. 3 is a perspective schematic drawing of the upper and lower halves and linkage assembly portions of the flexure weighing system.
Figure 4:
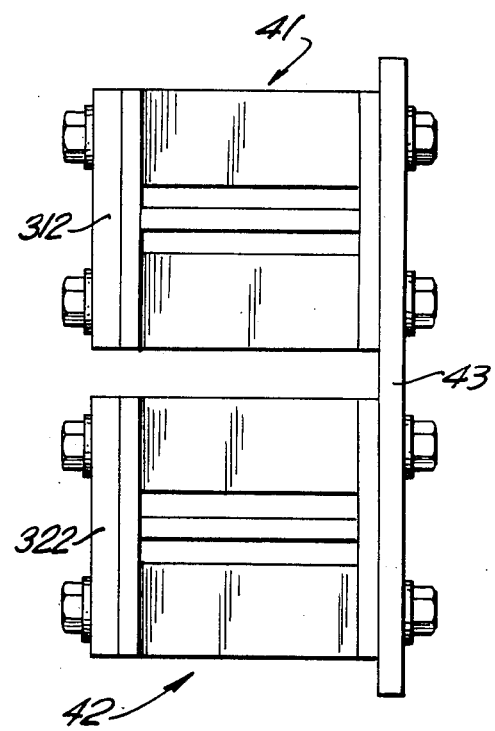
FIG. 4 is an end view of the flexure linkage assembly.

FIG. 3 shows in perspective the upper beam 31 and the lower beam 32 without bracing members 31A and 32A shown in FIG. 2 and further shows the flexure linkage assembly 40. FIG. 3 also shows boxes numbered 25U, 25L, 26U and 26L which represent schematically the similarly numbered flexures of FIG. 2.

Upper beam 31 consists of a rectangular portion 311 which is rigidly connected to an outwardly extending member 312. Similarly lower beam 32 consists of a rectangular portion 321 which is rigidly connected to an outwardly extending member 322. The end of member 312 is disposed above the end of member 322. These two ends are connected together by flexure linkage assembly 40. As is shown in FIG. 4, upper beam 31 is connected through member 312 to flexure 41 which is in turn connected to the upper portion of mounting plate 43. The lower portion of mounting plate 43 is connected to a second flexure 42. Flexure 42 is also connected to member 322 of lower beam 32 so that a flexible linkage assembly linking beams 31 and 32 is formed.

Returning to FIG. 2, upper beam 31 is also connected to a dashpot 50 which damps out oscillations of the system caused by outside factors such as vibrations from nearby plant machinery. Beam 31 is also connected to a weight sensor 70. Vertical movement of beam 31 is monitored by the weight sensor 70 and converted into an electrical signal indicative of the movement of beam 31 and consequently indicative of the weight upon weighing platform 22. This signal may be used to control the speed of motor 15.

FIG. 2 also shows calibration springs 27 and 28 which are connected, in compression, between the base of main frame 22 and the outer ends of beams 31 and 32, respectively. By suitably selecting the spring constant of springs 27 and 28, flexure weighing system 20 can be adjusted for the weighing of many different ranges of loads so that, for each range of loads, the maximum displacement of split-beam assembly 30 corresponds to the maximum weight of the range. It should be recognized that the flexures in the system have a certain resistance to movement which exists independently of the use of calibration springs. For certain applications, this resistance may be sufficient so that calibration springs need not be used. This is particularly true for small capacity weighing systems. Additional counterbalance weights, not shown, may be used to offset or to tare all or the bulk of the weight of any feeder mechanism, such as the auger feed mechanism 10 of FIG. 1, used in conjunction with the flexure weighing system 20.

The final feature of the flexure weighing system 20 shown in FIG. 2 is the electrical connection of weight sensor 70 to circuit means contained within electrical housing 90. Housing 90 is sealed so that the circuitry contained therein is isolated from the environment of system 20. Housing 90 is electrically connected to weight sensor 70 by wires contained in and protected by a sturdy sealed electrical conduit 91.

This isolation of the electrical system from the environment of the flexure weighing system 20 coupled with the toughness of the flexures, provides for a particularly corrosion and degradation-free system. Flexures 25U, 25L, 26U, 26L, 41 and 42 are typically made of stainless steel. So long as they are not flexed beyond their elastic limit and do not become permanently twisted, the flexures are unaffected by the weighing process. Stops which prevent beams 31 and 32 from moving far enough to flex the flexures beyond their elastic limits, can be incorporated to protect the system against the effects of an inadvertantly applied excess load.

The weighing operation of flexure weighing system 20 may be briefly summarized as follows. Weight is placed on weighing platform 22. Downward force is transmitted through mounting studs 24 and flexures 26U and 26L to the load-bearing ends of beams 31 and 32. As a result of this downward force upon the ends of beams 31 and 32, flexures 25U rotate slightly counter-clockwise and flexures 25L rotate slightly clockwise as illustrated by arrows in FIG. 5 located near those flexures. The other arrows shown in FIG. 5 indicate the directions of rotations of the flexures they are associated with. The load-bearing ends of beams 31 and 32 therefore lower slightly. As this occurs, flexures 26U and 26L also rotate slightly. Also, the linkage flexures 41 and 42 rotate slightly as the interconnected ends of beams 31 and 32 rise. The amount of rise ($d_{rise}$), the quantity measured by weight sensor 70 and translated by it into an electrical signal indicative of the weight, is mathematically related to the amount by which the load-bearing end of the beam 31 lowers ($d_{lowered}$) as follows: $d_{rise} = (d_1/d_2) \times d_{lowered}$ where $d_1$ and $d_2$, it will be recalled, are respectively the distance between the center of weight sensor 70 and the axis of rotation of flexures 25U and the distance between the axes of rotation of flexures 26U and 25U. Weight sensor 70 produces an electrical signal which is indicative of the weight on the weighing platform 22.

Further details of flexure linkage assembly 40 are discussed in the context of FIG. 5 which shows a side elevation view along section line B—B of FIG. 2. As discussed above, upper beam 31 is connected to flexure 41. Lower beam 32 is connected to flexure 42. Both flexures 41 and 42 are connected to mounting plate 43. In the preferred embodiment, these connections are made using nuts and bolts; however, other methods of connection may be used. Where nuts and bolts are used to join two surfaces either one or both of which is not machined flat, shims are used so that the flexures do not become warped when the bolts are fully tightened. The mounting plate 43 preferably has four horizontal slots 44 and four vertical slots 45 (only three vertical slots are visible in FIG. 5) cut through it. These slots 44 and 45 are used for adjusting flexure weighing system 20 when it is first installed. These adjustments in most cases will only need to be made once.

The slots 44 are used to adjust the horizontal distance $d_4$ from the axial center of flexure 42 to the axial center of the two flexures 25L so that it is substantially equal to the horizontal distance $d_3$ from the axial center of flexure 41 to the axial center of the two flexures 25U. When $d_4$ is equal to $d_3$, the flexure weighing system 20 will be insensitive to whether weight is placed to the left or right or the front or back of weighing platform 22. The slots 45 are used to level the split-beam assembly 30.

Figure 6:
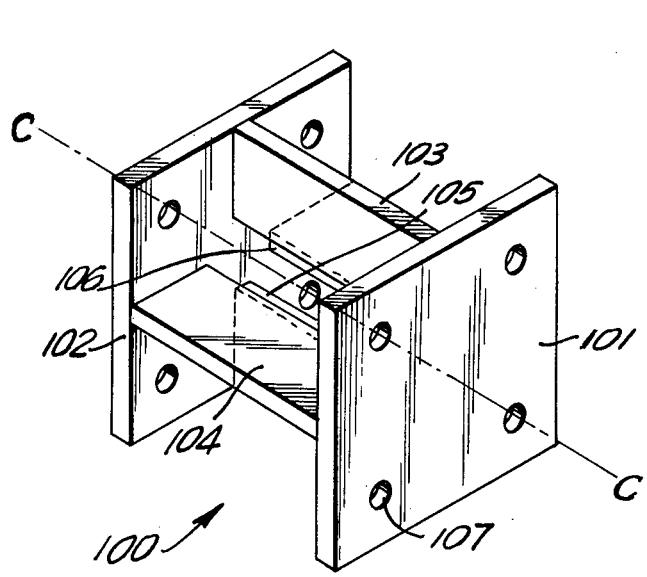
FIG. 6 is a perspective view of one flexure suitable for use in the flexure weighing system.
Figure 7:
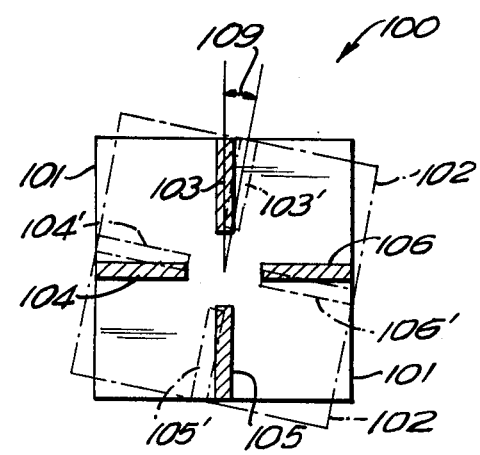
FIG. 7 is an end view of the flexure of FIG. 6 showing the flexure in a flexed position.

FIGS. 6 and 7 illustrate what is meant when it is said that the flexures 25U, 25L, 26U, 26L, 41 and 42 rotate, flex or pivot. FIG. 6 shows a single flexure 100 in the no-load position. This flexure 100 consists of two flanges or flange-like elements 101 and 102 and four interconnecting cross-members 103, 104, 105 and 106. The cross-members 103–106 preferably comprise elongated ribbon-like members which are all substantially identical. The connection between each cross-member and the flanges 101 and 102 is made by welding. Cross-members 103–106 are preferably fabricated from stainless steel selected from the group consisting of AISI types 410, 420 and 440, tempered to a hardness of between about 42 to about 55 Rockwell C. Preferably, the flanges 101 and 102 are fabricated from AISI type 304 stainless steel. Two of the cross-members, for example 103 and 105, are disposed in a first plane and the other two 104 and 106 are disposed in a second plane preferably perpendicular to the first. The four cross-members 103–106 are symmetrically disposed about a pivot axis C—C extending perpendicular to the flanges 101 and 102 and passing through their centers. FIG. 6 also shows holes such as hole 107 for mounting flexure 100. It will be appreciated that when one flange 101 is rigidly mounted to a frame and torque is applied to the other flange the second flange rotates with respect to the first. This rotation is illustrated by Fig. 7.

FIG. 7 shows an end view of flexure 100 looking along the axis of rotation C—C when flange 102 has rotated from its initial orientation through an angle 109 due to application of torque. The cross-members 103–106 are twisted substantially uniformly throughout their length so that the orientation of their ends adjacent flange 102 are indicated by solid lines 103–106 and at flange 101 by broken lines 103'–106'. When the torque is removed, the resilience of cross-members 103–106 will cause them to return flange 102 to its neutral position. In the preferred embodiment, the angle of rotation 109 is less than or equal to three degrees; however, larger angles of rotation are possible as long as the steel for the flexures is selected so that the steel does not become permanently deformed when maximum rotation occurs.

Flexures of suitable size for any desired application can be constructed according to the discussion above or according to the specification of U.S. Pat. No. 4,042,051, and flexures so constructed are suitable for use as any of the flexures 25U, 25L, 26U, 26L, 41 and 42 of flexure weighing system 20. Alternatively, for smaller flexure weighing systems 20, a prefabricated flexure such as Model No. 5032-400 manufactured by the Bendix Corporation has been found satisfactory. It will be appreciated by those skilled in the art that any suitable flexure may be used in the flexure weighing system of the invention.

Figure 8:
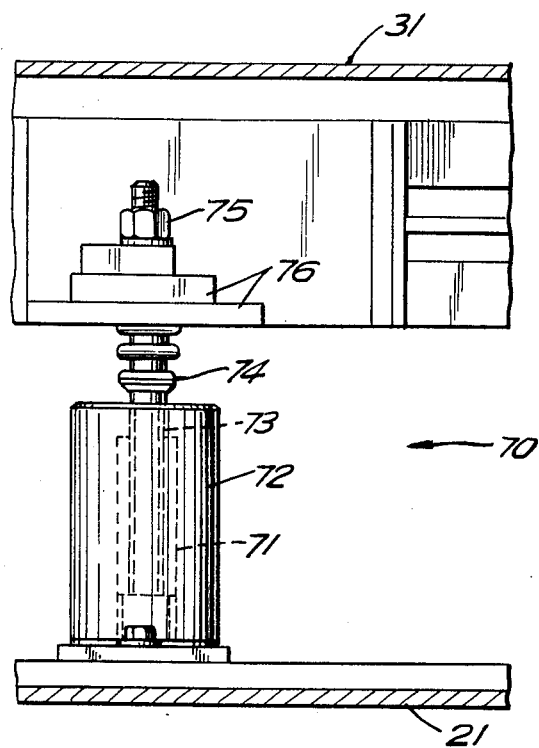
FIG. 8 is an elevation of the weight sensor portion of the flexure weighing system.

Weight sensor 70 shown in FIG. 8 includes an induction coil 71 in a dustproof housing 72 which is attached to the base of main frame 21, an armature 73 which fits into the center of induction coil 71, a collar 74, and a locking nut 75 which fits onto a threaded upper portion of armature 73. The armature 73 connects to beam 31 by way of brackets 76 and the locking nut 75. Locking nut 75 and the threaded upper portion of armature 73 allow for the adjustment of weight sensor 70 by simply loosening adjusting nut 75, adjusting the vertical position of the armature 73 and then tightening nut 75 again. The armature 73 does arc slightly in its travel within the induction coil 71 but, when properly adjusted by adjustment of mounting brackets 76, armature 73 will not touch the inside of the coil over the full range of operation of flexure weighing system 20. A common load cell might be used, rather than the inductive coil arrangement shown in FIG. 8, as weight sensor 70. However, most load cells provide resolution of only 1 part in 40,000 while the inductive coil arrangement discussed above is capable of providing resolution of 1 part in 1,048,000.

Figure 9:
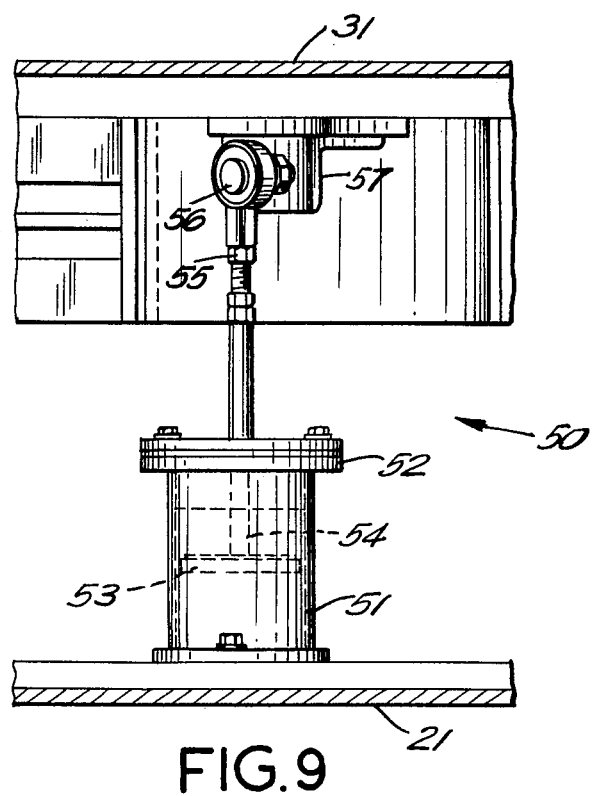
FIG. 9 is an elevation of the dashpot portion of the flexure weighing system.

Dashpot 50 shown in FIG. 9 damps out disturbances due to operation of nearby equipment or normal plant vibration. Dashpot 50 consists of a body 51 connected to the base of main frame 21, a cover and gasket unit 52, a piston 53 attached to one end of a plunger shaft 54, an adjustable nut 55 for adjusting the amount of damping produced, and a corrosion-resistant ball joint 56 connecting the other end of plunger shaft 54 to a bracket 57 affixed to beam 31. Dashpot body 51, typically cylindrical, is partly filled with oil, and only a small clearance is provided between piston 53 and the inner wall of body 51. To insure that any movement of shaft 54 will be substantially vertical so that no weighing inaccuracies will be caused by interference between piston 53 and the inner wall of body 51, ball joint 56 prevents arcing of shaft 54.

The above discussion of flexure weighing system 20 describes a preferred embodiment of a split-beam balance system having ten flexures. It is apparent that a greater number of flexures can be used (for example, two or more flexures may be added to flexure linkage assembly 40) or that fewer flexures might be used (for example, studs 24 might be connected to beams 31 and 32 using a ball joint connection similar to that described for connecting dashpot 50 to beam 31). A reduction in the number of flexures used would of course generate a certain amount of friction in the weighing system since the flexures described are friction-free. Any reduction in the number of flexures would also tend to increase the susceptibility of the system to an adverse operating environment, for example, a knife edge pivot or a ball bearing is more susceptible to grit and dust from the workplace than is a flexure.

I claim:

1. A highly stable flexure based industrial weighing apparatus having a low center of gravity and high resistance to noise forces due to vibration and similar influences in the industrial work environment comprising a split-beam assembly including two beams, each beam having an interconnecting end and a load-bearing end, the interconnecting ends of said beams being flexurally connected by a flexure linkage assembly including at least two flexures, a rectangular frame having two sidewalls and two endwalls with each sidewall connected to two points between the two ends of each beam by a flexure, the two points between the two ends of each beam being equidistant from their respective end walls so that each set of two points defines a pivot axis for its respective beam, a weighting platform located above the beams and connected to one end of each of a plurality of mounting studs, the other end of each of the plurality of mounting studs being connected to the load-bearing end of one or the other of the beams, with the load-bearing end of each beam connected to at least one stud, the plurality of mounting studs supporting the weighing platform and transmitting a load force from the weighing platform to the load-bearing ends of the beams when an object to be weighed is on the weighing platform, each of the flexures connecting the frame to the beams comprising a plurality of cross-members spaced about the pivot axis for the beam so that each flexure is resistant to noise forces which are not applied parallel to the load force, said load force causing each of the flexures connecting the frame to the beams to flex about its pivot axis thereby causing each of the beams to rotate slightly about its pivot axis, and means for sensing vertical movement of a predetermined point proximate to the interconnecting end of one of the beams and producing a signal indicative of that movement and consequently indicative of the weight of the object placed upon the weighing platform.

2. The apparatus of claim 1 wherein the flexure linkage assembly comprises two flexures and a mounting plate, the interconnecting end of each beam is connected to a different one of the two flexures, and each of the flexures is also connected to the mounting plate.

3. The apparatus of claim 1 further comprising a dashpot connected between the frame and one of the beams.

4. The apparatus of claim 1 wherein the mounting studs are connected to the beams by way of flexures with one flexure for each connection.

5. The apparatus of claim 4 wherein the means for sensing movement of the predetermined point on one of the beams and producing a signal indicative of the magnitude of that movement comprises a weight sensor including an armature and an induction coil, said armature having an upper portion connected to one of the beams at the predetermined point and a lower portion extending into the induction coil, said induction coil being connected to means for producing an electrical signal in response to the extent to which the armature extends into the induction coil.

6. The apparatus of claim 5 further comprising at least one adjustable calibration spring means connected between the load-bearing end of one beam and the frame, whereby the range of movement of the predetermined point may be controlled regardless of the range of weight carried by the container.

7. The apparatus of claim 4 wherein each beam includes a rectangular portion and the plurality of mounting studs comprises four studs which are connected with one stud near each of the corners of the rectangular frame to the rectangular portions of the beams at points located distally an equal distance from the center of the weighing apparatus.

8. The apparatus of claim 7 wherein the four points at which the studs are connected to the beams are proximate the four corners of the rectangular portions of the beams located distally from the center of the weighing apparatus.

9. The apparatus of claim 8 wherein one extending member is longer than the other extending member and the extending member which is longer is connected near its end to the means for sensing vertical movement and producing a signal so that a larger beam displacement is sensed by said means for sensing.

10. The apparatus of claim 1 wherein the flexure linkage assembly comprises a first flange-like element fixedly mounted on the interconnecting end of a first of the beams, a second flange-like element disposed in spaced parallel relationship with respect to said first flange-like element, a mounting plate fixedly mounted on said second flange-like element, a third flange-like element fixedly mounted on said mounting plate member, a fourth flange-like element disposed in spaced, parallel relationship with respect to said third flange-like element and fixedly mounted on the interconnecting end of the second of the beams, and a first plurality of elongated, resilient cross-members extending perpendicular to and interconnecting said first and second flange-like elements, and a second plurality of elongated, resilient cross-members extending perpendicular to and interconnecting said third and fourth flange-like elements.

11. The apparatus of claim 10 wherein the pivot axis of each beam lies between the flexure linkage assembly and an axis defined by the points at which the studs are connected to that beam whereby when a load force is transmitted by the studs to the beams, the load-bearing ends of the beams are forced downwards and the interconnecting ends of the beams are forced upwards as the flexures connecting the frame to the beams flex about their pivot axis.

12. The apparatus of claim 10 wherein each beam further comprises an extending member which extends perpendicularly from the rectangular portion and the two members are flexurally connected by the flexure linkage assembly at the center of weighing apparatus.

13. The apparatus of claim 12 wherein the maximum displacement of the beam to be sensed when the weighing apparatus is fully loaded is approximately ¼ inch.

14. The apparatus of claim 12 further comprising a dashpot wherein the dashpot is connected between the frame and one of the beams at a point beyond the center of the weighing apparatus so that a higher signal to noise displacement ratio and more effective damping is achieved.

15. The apparatus of claim 1, 2, 4, 5, 3, 6, 10, 7, 11, 8, 12, 9, 13 or 14 wherein the cross-sectional area of the cross-members of each flexure in any plane perpendicular to the pivot axis of the flexure collectively is symmetrically disposed about the pivot axis.

16. A flexure weighing apparatus comprising a split-beam assembly including two beams, each beam having an interconnecting end and a load-bearing end, a first flange-like element fixedly mounted on the interconnecting end of a first of the beams, a second flange-like element disposed in spaced parallel relationship with respect to said first flange-like element, a mounting plate fixedly mounted on said second flange-like element, a third flange-like element fixedly mounted on said mounting plate member, a fourth flange-like element disposed in spaced, parallel relationship with respect to said third flange-like element and fixedly mounted on the interconnecting end of the second of the beams, and a first plurality of elongated, resilient cross-members extending perpendicular to and interconnecting said first and second flange-like elements, a second plurality of elongated, resilient cross-members extending perpendicular to and interconnecting said third and fourth flange-like elements, a frame connected to each beam between the two ends thereof, a weighing platform above the beams, a plurality of mounting studs supporting the weighing platform and connected to the load-bearing ends of the beams, the load-bearing end of each beam being connected to at least one stud, and means for sensing vertical movement of a predetermined point on one of the beams and producing a signal indicative of the magnitude of that movement.

17. Apparatus as defined in claim 16 wherein the mounting plate has slots cut in it and is mounted to the second and third flange-like elements using nuts and bolts which can be loosened so that the mounting plate can be readily readjusted to balance the weighing apparatus.

18. The apparatus of claim 16 wherein the frame is connected to fifth and sixth flange-like elements, the beams are connected between the ends thereof to seventh and eighth flange-like elements disposed in spaced, parallel relationship to the fifth and sixth flange-like elements respectively, a third plurality of elongated, resilient cross-members extends perpendicular to and interconnects the fifth and seventh flange-like elements, and a fourth plurality of elongated, resilient cross-members extends perpendicular to and interconnects the sixth and eighth flange-like elements.

19. The apparatus of either of claims 16 and 18 wherein the studs at the load-bearing ends of the first and second beams are connected respectively to ninth and tenth flange-like elements, the load bearing ends of the first and second beams are connected respectively to eleventh and twelfth flange-like elements disposed in spaced, parallel relationship to the ninth and tenth flange-like elements respectively, a fifth plurality of elongated, resilient cross-members extends perpendicular to and interconnects the ninth and eleventh flange-like elements, and a sixth plurality of elongated, resilient cross-members extends perpendicular to and interconnects the tenth and twelfth flange-like elements.

20. The apparatus of claim 19 wherein the cross-sectional area of said cross-members on any plane parallel to their respective flange-like elements collectively is symmetrically disposed about a pivot axis extending perpendicular to their respective flange-like elements.

21. The apparatus of claim 20 wherein the means for sensing movement of the predetermined point on one of the beams and producing a signal indicative of the magnitude of that movement comprises a weight sensor including an armature and an induction coil, said armature having an upper portion connected to one of the beams at the predetermined point and a lower portion extending into the induction coil, said induction coil being connected to means for producing an electrical signal in response to the extent to which the armature extends into the induction coil.

* * * * *